United States Patent

Saito

Patent Number: 5,996,618
Date of Patent: Dec. 7, 1999

[54] VALVE NOZZLE

[75] Inventor: Toshio Saito, Tokyo, Japan

[73] Assignee: Fisa Corporation, Tokyo, Japan

[21] Appl. No.: 09/110,342

[22] Filed: Jul. 6, 1998

[30] Foreign Application Priority Data

Jul. 18, 1997 [JP] Japan ................................ 9-209808

[51] Int. Cl.⁶ ............................................. F16K 15/00
[52] U.S. Cl. ..................... 137/543; 137/542; 425/563
[58] Field of Search ................................ 137/543, 542,
137/540; 425/563, 566, 564, 568; 239/571

[56] References Cited

U.S. PATENT DOCUMENTS

| | | | |
|---|---|---|---|
| 2,660,246 | 11/1953 | Otis et al. | 137/543 |
| 3,486,522 | 12/1969 | Ashman | 137/543 |
| 3,777,990 | 12/1973 | Herzog | 239/571 |
| 3,800,824 | 4/1974 | Medina | 137/543 |
| 3,868,061 | 2/1975 | Hehl | 239/571 |
| 3,954,209 | 5/1976 | Ramond | 425/146 |
| 4,010,903 | 3/1977 | Sakuri et al. | 425/245 |
| 4,082,224 | 4/1978 | Mangus | 137/542 |
| 4,285,661 | 8/1981 | Yotsutsuji et al. | 425/563 |
| 4,427,361 | 1/1984 | Saito | 425/563 |
| 4,681,528 | 7/1987 | Maruyama et al. | |
| 4,765,364 | 8/1988 | Arcari | 137/542 |

FOREIGN PATENT DOCUMENTS

| | | |
|---|---|---|
| 0011805 | 6/1980 | European Pat. Off. . |
| 2173008 | 8/1973 | France . |
| 4311196 | 6/1994 | Germany . |
| 163542 | 10/1982 | Japan . |
| 290021 | 12/1986 | Japan . |
| 8-156025 | 6/1996 | Japan . |
| 515113 | 12/1971 | Switzerland . |

*Primary Examiner*—Denise L. Ferensic
*Assistant Examiner*—Joanne Y. Kim
*Attorney, Agent, or Firm*—Roylance, Abrams, Berdo & Goodman, L.L.P.

[57] ABSTRACT

The invention relates to a valve nozzle used for a molding machine of synthetic resin and is characterized in that a gate opening and closing mechanism consisting of a spool having a head portion at which a circular cross-sectioned part and a notched part are formed, a shaft portion and an arrow feather shaped projection, and a coil spring which presses the abovementioned spool in the direction opposite to the gate, is disposed in the interior space of a nozzle head attached to the tip end of a nozzle holder via a screw mechanism, when resin pressure is less than a certain fixed level, the abovementioned spool is pressed by the abovementioned coil spring in the direction opposite to the gate and the entire periphery of the circular cross-sectioned portion of the head portion of the spool is brought into contact with the interior wall of the gate of the nozzle head to cause the resin flow path to be closed, and when the resin pressure becomes higher than a certain fixed level, the head portion of the abovementioned spool overcomes a pressing force of the coil spring and is caused to protrude outward of the gate of the nozzle head, wherein a resin flow path is formed between the notched part of the head portion of the spool and the interior wall of the gate and the resin flow path is caused to open. With such construction, resin flow in the vicinity of the gate can be remarkably improved, and in particular it is possible to obtain molding components which are rarely cracked in comparison with molded components in which a conventional type nozzle is used.

6 Claims, 2 Drawing Sheets

VALVE NOZZLE

BACKGROUND OF THE INVENTION

1. Field of the invention

The present invention relates to a valve nozzle used for a molding machine for synthetic resin, and in particular relates to a valve nozzle and a shutoff nozzle used for hot liner molding.

2. Description of the prior art

Japanese laid-open patent publication No; 163542 of 1982 discloses a valve nozzle which is to open and close a flow path by causing the tip end of a shutoff pin to be brought into contact with the gate at the tip end part of the nozzle head, wherein the shutoff pin is pressed into the gate direction by a coil spring incorporated in an enclosed chamber, and if the pressure of the resin is increased over a certain figure and overcomes the pressing force of the coil spring, the shutoff pin moves in the direction of the enclosed chamber to cause the gate to be opened.

Furthermore, Japanese laid-open patent publication No. 290021 of 1986 describes a valve nozzle constructed so that a ring having a circular hole is disposed in the interior space of the nozzle head, a flow path is closed by causing the tip end of a spool to be engaged in the circular hole, and this state is maintained by a pressing force of a coil spring engaged with the spool in the opposite gate direction, wherein the pressure of the resin is increased over a certain figure and overcomes the pressing force of the coil spring, the spool moves in the gate direction to cause a flow path to be formed between the circular hole of the ring and a groove prepared at a part of the head of the spool.

Such a type as described in the abovementioned Japanese laid-open patent publication No. 163542 of 1982 has a difficulty by which molded products may be liable to be broken in the vicinity of the gate due to a great residual stress at the point when a resin path is closed. Furthermore, when the resin is extruded through the gate with the resin path open, the resin moves straight along the space of the gate and advances, changing its flow direction to the cross direction when it is brought into contact with a metal mold. Therefore, in this construction, the flow of resin around the gate may be worsened.

SUMMARY OF THE INVENTION

As has been made clear from the above description, the present invention aims at disclosing a valve nozzle, having a little remaining stress in the vicinity of a gate, by which a resin flow around the gate is further improved.

A valve nozzle according to the invention is characterized in that a gate opening and closing mechanism consisting of a spool having a head portion at which a circular cross-sectioned part and a notched part are formed, a shaft portion and an arrow feather shaped projection, and a coil spring which presses the abovementioned spool in the direction opposite to the gate, is disposed in the interior space of a nozzle head attached to the tip end of a nozzle holder via a screw mechanism, when the resin pressure is less than a certain fixed level, the abovementioned spool is pressed by the abovementioned coil spring in the direction opposite to the gate and the entire periphery of the circular cross-sectioned portion of the head portion of the spool is brought into contact with the interior wall of the gate of the nozzle head to cause the resin flow path to be closed, and when the resin pressure becomes higher than a certain fixed level, the head portion of the abovementioned spool overcomes a pressing force of the coil spring and is caused to protrude outward of the gate of the nozzle head, wherein a resin flow path is formed between the notched part of the head portion of the spool and the interior wall of the gate, thereby causing the resin flow path to be opened.

With a valve nozzle according to the invention constructed as described above, it is possible to remarkably improve the resin flow in the vicinity of the gate and to obtain a molded component which is rarely broken in comparison with molded components in which a conventional type nozzle is employed. Thereby, the abovementioned theme can be solved.

DETAILED DESCRIPTION OF THE PREFERRED EMBODIMENT

Next, a further detailed description is given of the invention in compliance with the accompanying drawings.

The drawings show a preferred embodiment of the invention, in which.

Figure 3:
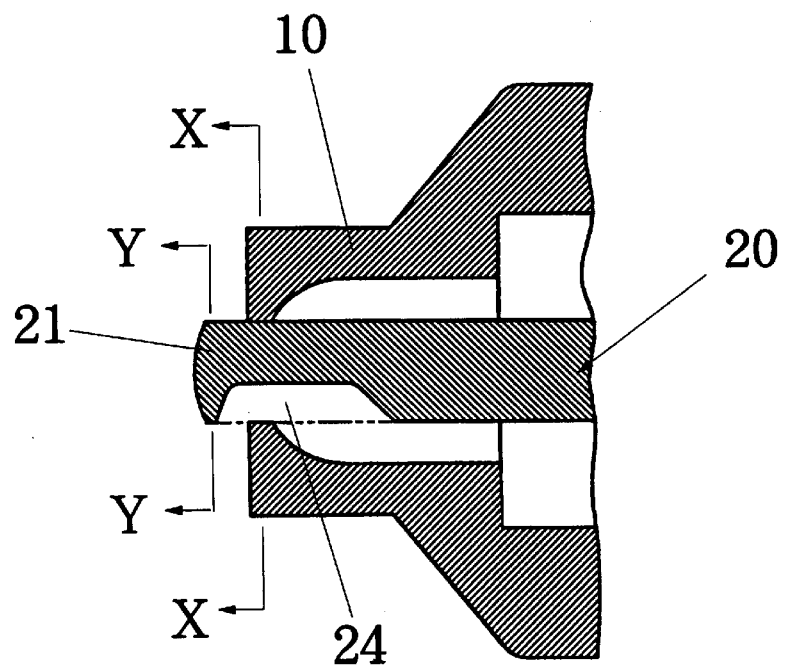
Figure 3:
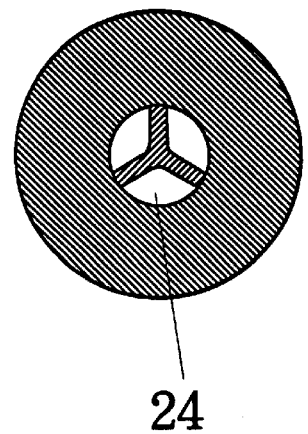
Figure 3:
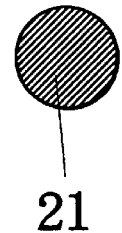

FIG.3-A is an enlarged cross-sectional view of the gate portion when it is opened, FIG.3-B is a sectional view taken along the line X—X in FIG.3-A, FIG.3-C is a sectional view taken along the line Y—Y in FIG.3-A.

In these drawings, 10 is a nozzle head, 11 is a gate, 12 is a nozzle holder, 13 is a staged portion, 14 is a slideway, 20 is a spool, 21 is a spool head portion, 22 is a spool shaft portion, 23 is an arrow feather shaped projection of the spool, 24 is a notched portion of the spool head portion, 25 is a side of the arrow feather shaped projection, 26 is the tip end of the arrow feather shaped projection, and 30 is a coil spring.

Figure 1:
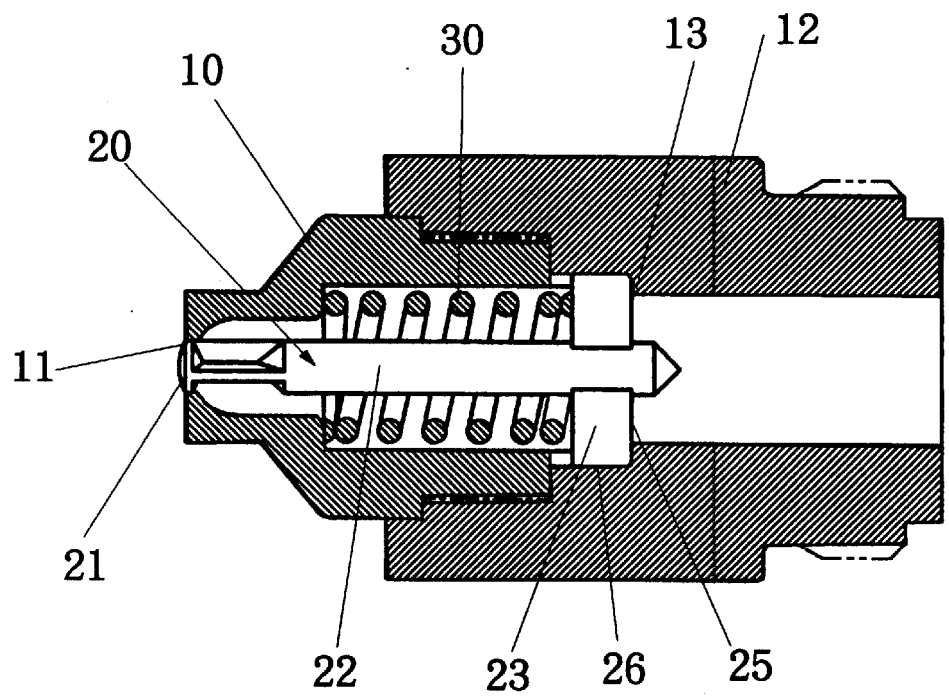
FIG. 1 is a cross-sectional view showing a state where the gate is closed.
Figure 2:
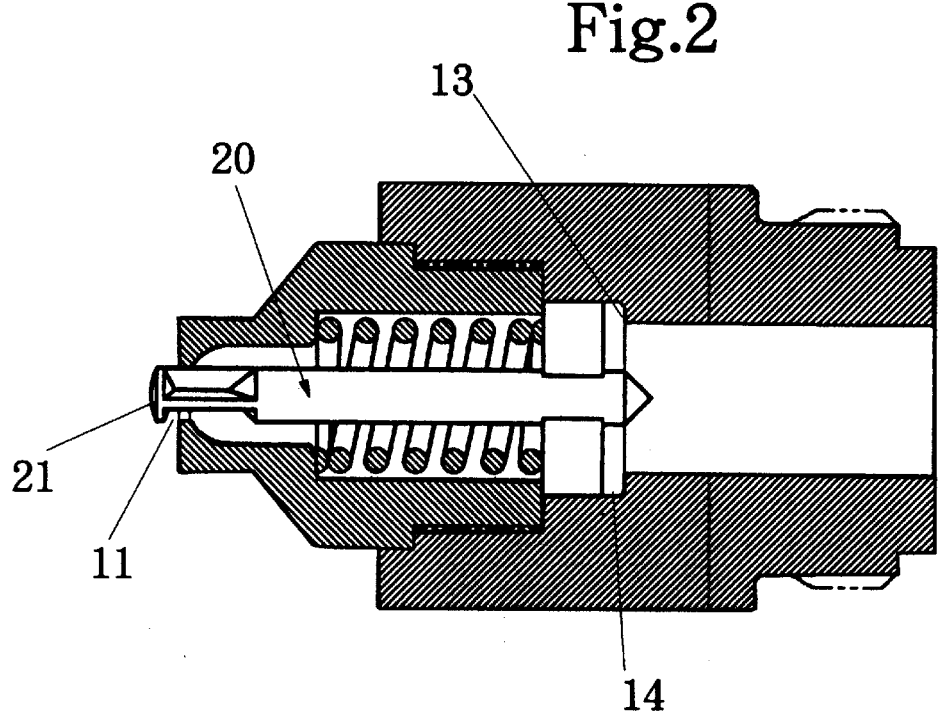
FIG. 2 is a cross-sectional view showing a state where the gate is open.

As illustrated in FIG. 1 and FIG. 2, nozzle head 10 has gate 11 formed of two-staged circular holes at the central tip end thereof and is detachably attached to the tip end of nozzle holder 12 by a screw mechanism.

20 is a spool which is constructed of tip end head portion 21, intermediate shaft portion 22 and arrow feather shaped projection 23 disposed at the rear end. Spool 20 is pressed by coil spring 30 in the upper right direction of the drawing, wherein when the nozzle is closed, the end portion of the side 25 of the arrow feather shaped projection 23 remains standstill in such a state where it is in contact with the staged portion 13 formed at the nozzle holder 12. Furthermore, the tip end portion 26 of the arrow feather shaped projection 23 of the spool 20 is brought into contact with the slideway 14 formed at the front side of the staged portion 13 of the nozzle holder 12. Therefore, at the spool 20, its backward movement in its linear reciprocating movement is regulated by the staged portion 13 of the nozzle holder 12, and since the tip end portion 26 of the arrow feather shaped projection 23 is caused to slide along the slideway 14, the spool 20 by the arrow feather shaped projection 23 is able to make a linear reciprocating movement without any side sway. Thus, regulation of the movement of spool 20 prevents the head portion 21 of the spool 20, which is brought into contact with the inner circumferential face of the gate 11, from being given an unfavorable force, wherein the head portion 21 can be prevented from being damaged.

A construction that regulates the actions of the arrow feather shaped projection 23 at the spool 20 may be adopted at the nozzle head itself. For example, such a construction may be employed, that a notched portion is provided at the rear end side of the nozzle head 10, and the surrounding of the tip end portion 26 of the arrow feather shaped projection 23 is inserted into the notched part so to be slidable. The notched portion provided at the nozzle head 10 may be constructed so as to have a feature of the slideway 14 at the nozzle holder 12, and if the notched portion is clogged by attaching a cover-like member, which covers the rear end of the nozzle head 10, it may substitute the feature of the staged portion 13 at the nozzle holder 12.

As described above, the mechanical elements to regulate the movement of spool 20 are limited to the relationship with only the nozzle head 10, wherein the machining to produce a nozzle holder 12 does not require any staged portion 13 and slideway 14. The machining may be made remarkably simple.

Although the arrow feather shaped projection 23 of the spool 20 is composed of three feathers, they may be of two or four, or more feathers.

As shown in FIG.3, the vicinity of the tip end of the head portion 21 of the spool 20 is circularly cross-sectioned and subsequently a notched portion 24 is formed. Therefore, with the nozzle closed, the outer circumference of the circularly cross-sectioned portion in the vicinity of the tip end of the head portion 21 is brought into contact with the interior wall of a circular hole of the gate 11 to cause the resin flow path to be closed. Furthermore, although three notched portions 24 are formed, they are not limited to this embodiment as far as the flow amount of resin and smooth movement (linear reciprocating movement) of the head portion of the spool 20 are secured. For example, since the resin is caused to move to the gate 11 while being turned by the existence of the coil spring 30, a blending effect of the resin can be secured, and in order that the turning motions of the resin at the gate 11 portion are not lost, the notched portion 24 may be formed to be spiral.

When the resin pressure exceeds a certain fixed level, the gate direction force of the pressure components of the resin applied onto the spool 20 is made higher than the force given in the direction opposite to the gate according to the cross-sectional area of the shaft portion 22 of the spool 20, wherein if the pressure difference is set greater than the pressing force of the coil spring 30, the spool 20 is, as shown in FIG.2, caused to move in the direction of gate 11 to the position where the arrow feather shaped projection 23 is brought into contact with the rear end of the nozzle head 10. In this state, as shown in FIG.3-A and FIG.3-B, a resin flow path is formed between the circular hole of the gate 11 and the notched portion 24 formed at the head portion 21 of the spool 20.

When the resin pressure is set to be less than a certain fixed level, the spool 20 is returned to the state illustrated in FIG.1, wherein the flow path is closed.

The head portion 21 of the spool 20 carries out a linear reciprocating movement, and as shown in FIG.2, the head portion 21 of the spool 20 slightly protrudes outward of the gate 11 with the resin flow path open, wherein a resin flow path is formed between the head portion 21 and the inner circumference of the gate 11 by the notched portion 24.

Furthermore, a valve nozzle according to the present invention is constructed so that the tip end portion of the head portion 21 of the spool 20 protrudes outside the gate 11. Therefore, in a case of molded components, the thickness of which is thin, a recess may be formed on a metal mold corresponding to the gate 11 portion.

According to a valve nozzle of the invention described above, since a part of the head portion 21 is caused to exist outside the gate 11 with the valve open, the flow of the resin in the vicinity of the gate can be remarkably improved, and in particular, the residual stress in the vicinity of the gate can be reduced by returning the resin in the notched portion 24 inside the gate 11 when changing the resin flow path from OPEN to CLOSE. Therefore, it is possible to obtain molded components which are rarely cracked in comparison with molded components employing a conventional type nozzle. Thereby, the abovementioned theme can be solved.

Furthermore, even though resin enters the mechanical parts since there is no part which slides in precision, the linear reciprocating movement of the spool 20 is not adversely influenced. Still furthermore, when the gate 11 is closed, such an effect can be expected, by which resin filled in the metal mold does not reversely flow into the interior space of the nozzle head 10 by retraction of the head portion 21 which has protruded outward of the gate 11.

What is claimed is:

1. A value nozzle for regulating dispensing of a material, comprising:

a nozzle holder having a nozzle holder tip end, an interior cavity, and a slideway;

a nozzle head, attached to said nozzle holder, having an interior space, a nozzle head tip end, a nozzle holder end, and a gate at said nozzle head tip end, said interior space and said interior cavity defining a material flow through passage;

a spool disposed in said nozzle head interior space and extending into said nozzle holder interior cavity, said spool having a head portion, a shaft portion and an arrow feather-shaped portion with an arrow feather-shaped portion tip end, said spool being axially movable in said nozzle head between a closed position in which said head portion thereof engages and closes said gate to prevent material flow there through and an open position in which said head portion thereof is spaced from said gate and outside of said nozzle head to permit material flow through said gate, said arrow feather-shaped portion tip end contacting said nozzle holder interior cavity to control side sway movement of said spool, said head portion having a circular cylindrical part at an end of the spool and a notched part defining a portion of said flow through passage when said spool is in said open position; and a coil spring having a predetermined spring force mounted about said spool in said interior space such that material flowing there through is turned and blended by said coil spring, said coil spring biasing said head portion of said spool towards said closed position thereof and maintaining said head portion in said closed position when a material pressure is insufficient to overcome said predetermined spring force, said coil spring allowing said head portion of said spool to be forced away from said gate to said open position thereof when material pressure is sufficient to overcome said predetermined spring force.

2. The valve nozzle of claim 1, wherein said nozzle holder and said nozzle head are attached by a screw mechanism.

3. The valve nozzle of claim 2, wherein a radial shoulder of said nozzle holder engages said nozzle holder end of said nozzle head.

4. The valve nozzle of claim 1, wherein said nozzle holder includes a staged portion; and said arrow feather-shaped portion contacts said staged portion.

5. The valve nozzle of claim 1, wherein said nozzle holder end of said nozzle head further comprises a nozzle head notch portion engaging said arrow feather-shaped portion tip end.

6. The valve nozzle of claim 5, wherein all mechanical components regulating movement of said spool are attached to said nozzle head.

* * * * *